(12) United States Patent
Würsch et al.

(10) Patent No.: US 6,681,869 B2
(45) Date of Patent: Jan. 27, 2004

(54) HAND HELD ROTARY-PERCUSSION TOOL WITH AN ELECTRONIC DEPTH STOP

(75) Inventors: Christoph Würsch, Werdenberg (CH); Roland Schaer, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/086,678

(22) Filed: Mar. 1, 2002

(65) Prior Publication Data

US 2002/0129948 A1 Sep. 19, 2002

(30) Foreign Application Priority Data

Mar. 15, 2001 (DE) .......................... 101 12 364

(51) Int. Cl.⁷ .............................. B27C 3/08
(52) U.S. Cl. .................. 173/2; 173/201; 173/176; 173/178; 173/11
(58) Field of Search .............. 173/4–10, 176–183, 173/170, 2, 201, 11

(56) References Cited

U.S. PATENT DOCUMENTS

| | | | |
|---|---|---|---|
| 4,813,312 A | * | 3/1989 | Wilhelm .................. 173/6 |
| 5,626,199 A | * | 5/1997 | Henry et al. ............. 173/211 |
| 5,713,422 A | * | 2/1998 | Dhindsa .................. 173/4 |
| 6,016,878 A | * | 1/2000 | Jansson ................... 173/6 |
| 6,371,218 B1 | * | 4/2002 | Amano et al. ............ 173/180 |
| 6,415,875 B1 | * | 7/2002 | Meixner et al. .......... 173/176 |
| 6,520,270 B2 | * | 2/2003 | Wissmach et al. ....... 173/170 |

\* cited by examiner

*Primary Examiner*—Rinaldi I. Rada
*Assistant Examiner*—Mitchell Lopez
(74) *Attorney, Agent, or Firm*—Sidley Austin Brown & Wood, LLP

(57) ABSTRACT

A hand-held rotary-percussion power tool includes an electrical drive (2) for generating a torque transmittable to a boring tool used with the power tool for forming blind bores, a hammer mechanism (3) for applying impacts to the boring tool, control device (7, 7', 7") for controlling operation of at least one of the electrical drive (2) and the hammer mechanism (3), and an electronic depth stop (4). The depth stop include a sensor (5) for contactless, distance measuring of a depth of a blind bore, and a computation unit (6) for generating a signal indicating that a sensed measurement value (M) corresponds to a set value of the depth of the blind bore, and connected with the control device (7, 7', 7").

5 Claims, 1 Drawing Sheet

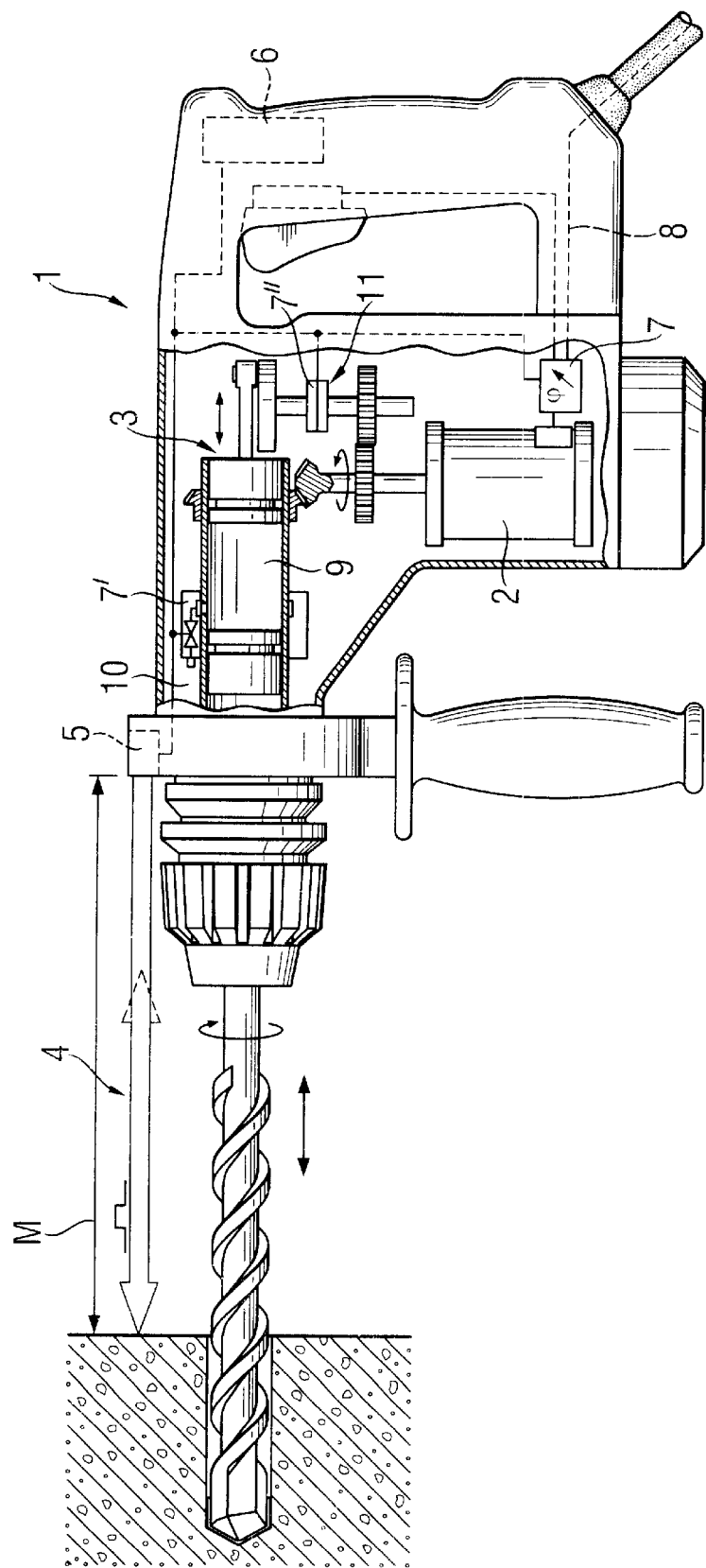

HAND HELD ROTARY-PERCUSSION TOOL WITH AN ELECTRONIC DEPTH STOP

BACKGROUND OF THE INVENTION

1. Field of the Invention

The present invention relates to a hand-held rotary-percussion tool such as e.g. a hammer drill and including an electronic depth stop.

2. Description of Prior Art

For producing blind bores with a predetermined depth, a depth stop, which stops removal of material after the tip of a boring tool reaches the set depth can be used. It is particularly important to be able to produce blind bores with a predetermined depth when high-loaded anchors are set in a stone-like material such as concrete, masonry and the like which are used in constructional industry.

German Publication DE 3214182 discloses a bar-shaped depth stop for a hammer drill. This depth stop prevents, upon a mechanical contract with the workpiece, further penetration of the boring tool while still maintaining the transmission of the torque to the boring tool. The mechanical contract results in stopping of the impact action.

DE 3912991 discloses the use of a spring-biased, adjustable, bar-shaped stop which interrupt power supply to a power drill drive upon reaching the set depth value. However, both types of stops, of DE 3214182 and DE 3912991, often present a danger to the tool user and, therefore, their use in constructional industry is indesirable.

DE 2838968 discloses a contactless electronic depth stop provided with ultra-sound, high frequency, or optical sensor means. The depth stop includes means that calculates the distance between the working tool surface and the sensor, which is provided in the power tool for determining the bore depth. The calculation means interrupts power supply to the drive when the set depth is reached. The turning of the drive off results, when the bores are formed in conventional constructional materials, with abrasive removable drillings formed during formation of a bore, in hooking of the boring tool in the blind bore.

DE 2855217 discloses a percussion-rotary tool in which the direction of rotation of the boring tool is reversed when a set depth is reached. The user is informed of the fact that the set depth has been reached by a disturbing jolt of the handle, which adversely affects the operational reliability. The impact action and removal of the abrasive material, after the set depth has been reached, continues.

An object of the present invention is to provide a hand-held rotary-percussion tool for forming bores in a stone-like material with a depth stop for contactless depth measurement in which hooking of the boring tool is prevented.

SUMMARY OF THE INVENTION

This and other objects of the present invention, which will become apparent hereinafter, are achieved by providing a hand-held rotary-percussion power tool including an electrical drive for generating a torque transmittable to a boring tool used with the power tool for forming blind bores, a hammer mechanism for applying impacts to the boring tool, a control device for controlling operation of at least one of the electrical drive and the hammer mechanism, and an electronic depth stop including a sensor for contactless, distance measuring of a depth of a blind bore and a computation unit for generating a signal indicating that a sensed measurement value corresponds to a set value of the depth of the blind bore, and connected with the control device. The control device reduces an impact action of the hammer mechanism while maintaining the torque transmittable to the boring tool in response to the indicating signal.

When a stone-like material is removed, the impact action primarily contributes to the abrasive removal of material, while the rotational movement or torque provides for displacement of the boring tool and for transportation of the moved material away. Therefore, upon an adequate reduction of the impact action, practically, no further removal of material takes place because of the non-linear increase of the characteristic curve of the material removal output over the impact action. At the same time, maintaining of the rotational movement in the same direction prevents hooking of the boring tool and an undesirable high deflection of the handle.

According to an advantageous embodiment of the present invention, the power tool has a pneumatic hammer mechanism rotationally connected with the drive, and the control device include a control element for controlling the transmission of the torque therebetween. Because of the non-linear increase of the characteristic curve of the impact output of the hammer mechanism over the rotational speed of the drive the reduction of the rational speed by the control element is sufficient for reduction of the impact output. The control element is formed advantageously as a phase-controllable current regulator arranged in the line connecting the power tool drive with its current source. Such current regulators are standard in hand-held power tools. However they should be modified in order to be controlled by the computation unit of the depth stop According to another advantageous embodiment of the present invention the hammer mechanism is also formed as a pneumatic hammer mechanism, and the control means includes an electrically controlled pneumatic valve that connects the gas spring of the hammer mechanism with a surrounding the hammer mechanism, space. The valve vents the gas pressure necessary for transmitting impacts, reducing the impact action or completely stopping the impact action.

According to a still further advantageous embodiment of the present invention, the control means includes electrically controlled clutch means, which is provided between the electrical drive and the hammer mechanism and which interrupts the power flow therebetween.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

Single FIGURE of the drawings shows a side, partially cross-sectional view of a hand-held power tool with an electronic depth stop according to the present invention.

DETAILED DESCRIPTION OF THE PREFERRED EMBODIMENT

A hand-held power tool, which is shown in the drawing, includes an electrical drive 2, a pneumatic hammer mechanism 3, and a laser pulse-based, contactless, electronic depth stop 4. The electronic depth stop 4 has a sensor 5 and a computation unit 6 that generates a signal when the measurement value M corresponds to the set value. The computation unit 6 is operatively connected with control elements 7, 7', and 7". The control element 7 is formed as a phase-controllable current regulator arranged in the line 8 connecting the drive 2 with the current source. The control element 7 is additionally controlled by a pressure-actuated switch provided in the handle of the power tool 1. The control element 7' is formed as an electrically controlled pneumatic valve arranged between a gas spring 9 of the hammer mechanism 3 and the surrounding the hammer mechanism 3, space 10. The control element 7" is formed as an electrically controlled clutch provided between the electrical drive 2 and the hammer mechanism 3.

Though the present invention was shown and described with references to the preferred embodiment, such is merely illustrative of the present invention and is not to be construed as a limitation thereof, and various modifications to the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A hand-held rotary-percussion borer comprising an electrical drive (2) for generating a torque transmittable to a boring tool used with the borer for forming blind bores; a hammer mechanism (3) for applying axial impacts to the boring tool; controls means (7, 7' and 7") for controlling operation of at least one of the electrical drive (2) and the hammer mechanism (3); and an electronic depth stop (4) including a sensor (5) for contactless, distance measuring of a depth of a blind bore, and a computation unit (6) for generating a signal indicating that a sensed measurement value (M) corresponds to a set value of a depth of the blind bore, and connected with the control means (7, 7', 7"), the control means, 7, 7', 7") reducing an impact for the hammer mechanism (3) while maintaining the torque transmittable to the boring tool in response to the indicating signal.

2. A hand-held rotary-percussion borer according to claim 1, wherein the control means include a first control element (7") for controlling transmission of a torque between the electrical drive (2) and the hammer mechanism (3), and a second control element (7) for controlling the rotational speed of the electronic drive (2).

3. A hand-held rotary-percussion borer according to claim 2, wherein the rotational speed controlling element (7) is formed as a current regulator arranged in a line connecting the electrical drive (2) with a current source.

4. A hand-held rotary-percussion borer according to claim 1, wherein the hammer mechanism (3) is formed as a pneumatic hammer mechanism including a gas spring (9), and wherein the control means includes an electrically controlled pneumatic valve (7') for communicating the gas spring with a surrounding of the hammer mechanism, space (10).

5. A hand-held rotary-percussion borer according to claim 2, wherein the torque transmission control element (7") is formed as an electrically controlled clutch.

\* \* \* \* \*